United States Patent [19]

Kramer

[11] 4,087,079
[45] May 2, 1978

[54] MIXING APPARATUS

[76] Inventor: Walter Kramer, Lussirain 6, Zug, Switzerland

[21] Appl. No.: 760,242

[22] Filed: Jan. 17, 1977

[30] Foreign Application Priority Data

Jan. 22, 1976  Switzerland .......................... 779/76

[51] Int. Cl.$^2$ .............................................. B01F 7/02
[52] U.S. Cl. ..................................... 366/131; 366/152
[58] Field of Search .................... 259/9, 10, 25, 26, 45, 259/46, DIG. 30

[56] References Cited

U.S. PATENT DOCUMENTS

| | | | |
|---|---|---|---|
| 1,700,510 | 1/1929 | Oches | 259/9 |
| 2,230,146 | 1/1941 | Myers | 259/9 |
| 2,366,673 | 1/1945 | Paley | 259/9 X |
| 3,163,403 | 12/1964 | Engels | 259/9 |
| 3,477,698 | 11/1969 | Smith | 259/25 |
| 3,682,447 | 8/1972 | Zucker | 259/DIG. 30 |
| 3,985,348 | 10/1976 | Skidmore | 259/25 |

*Primary Examiner*—Edward J. McCarthy
*Attorney, Agent, or Firm*—Michael Klotz

[57] ABSTRACT

An apparatus for continuous distribution of at least one additive, such as a pigment or the like material, in a particulate master or base material, such as a granular plastics or the like material, comprising a stationary chamber that has a relatively small volume and includes a rotary distributor having one or more arms with cranked end portions for movement along a circular path in a substantially vertical plane that is normal to the axis of rotation of the distributor; a first inlet for feeding the particulate master into the chamber is arranged below the upper horizontal tangent line of the circular path while at least one second inlet for feeding additive into the chamber is provided above the said tangent line.

A process for operating the apparatus by controlling input and output rates so as not to exceed a maximum charge level substantially defined by the upper horizontal tangent of the circular path and to form an inclined upper surface of the processed charge within the chamber for overrolling movement of the particles of the master with concurrent interblending of the additive supplied onto the inclined upper charge surface.

The inventive apparatus is particularly suited for continuously interblending a minor amount of at least one additive and a major or predominant amount of a master or base material of the type used in plastics processing, notably for coloring or the like modification of a plastics material or composition prior to extrusion or another plastics shaping operation.

14 Claims, 5 Drawing Figures

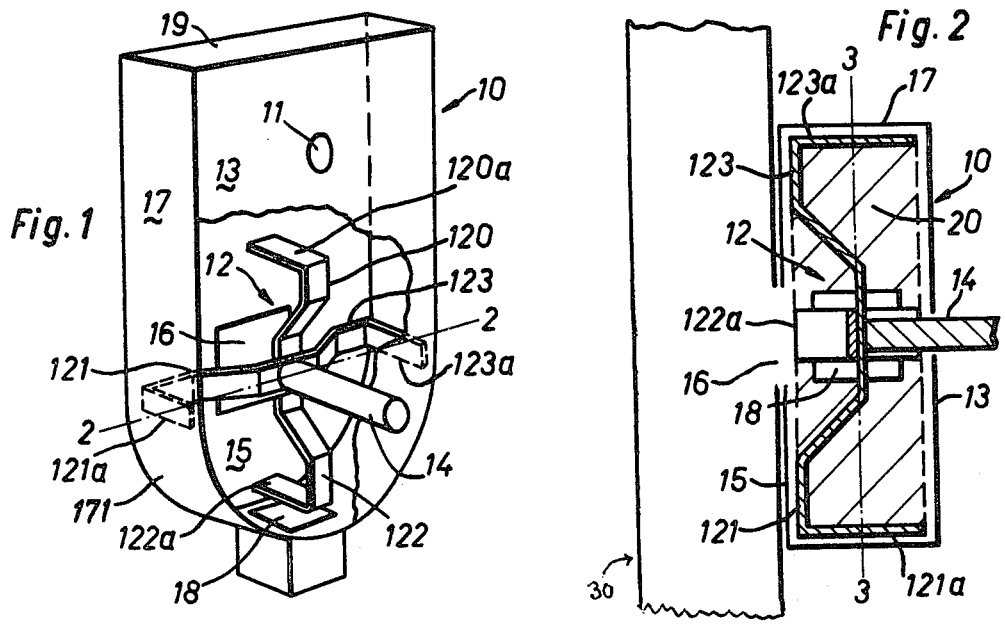
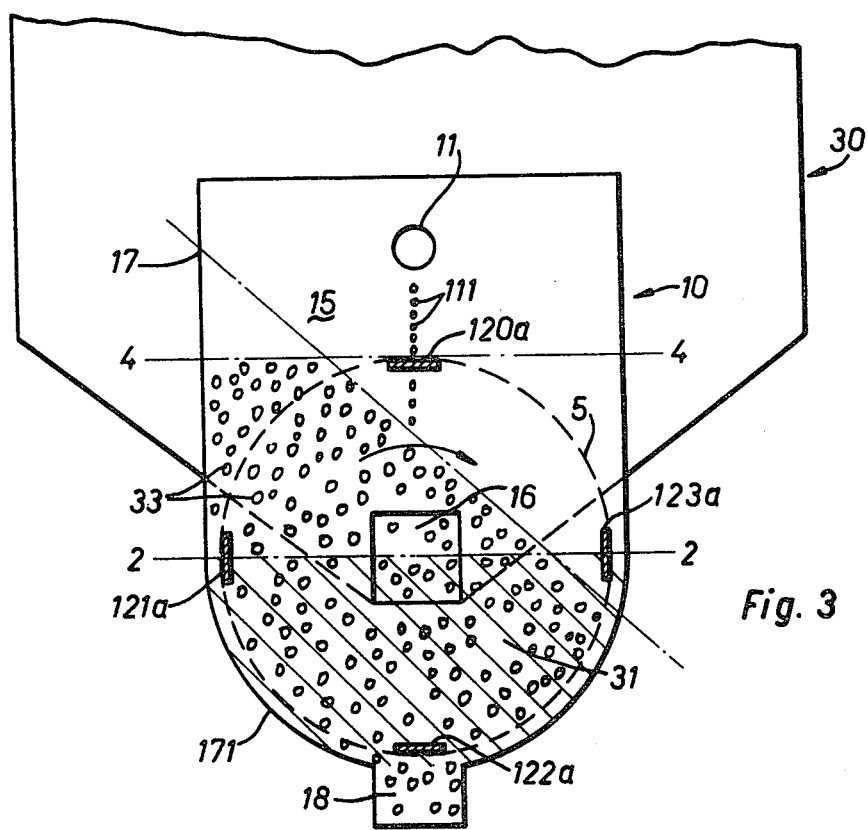

MIXING APPARATUS

BACKGROUND OF THE INVENTION

The present invention generally relates to the art of intermingling two or more dissimilar portions of material with the aim of attaining a desired level of uniformity in the resulting mixture or blend, and specifically to an apparatus for continuous distribution of at least one additive in a stream of particles of a master or base material.

Numerous and different types of mixing or blending devices are known for continuous intermingling of a particulate solids material as the main portion or base with a minor portion of an additive. In general, such prior art devices are intended for specific uses and specific types of materials. As long as the components of an intended mixture or blend are capable of forming relatively stable mixtures or blends, i. e. when the specific weights of the constituents, their bulk densities, particle sizes and other properties differ within reasonable limits, homogeneous distributions of an additive in a particulate solids base can be achieved in continuous operation by relatively simple devices.

When considering, as an example, a system consisting of a predominant portion, e.g. 90% by weight or more, of smooth and relatively large spheres, e.g. having diameters in the range of from 5 to 20 mm, and of a minor portion, e.g. 10% by weight or less, of a finely divided pulverulent material, e.g. having a particle size of less than 100 micrometers, it will be easily understood that such a system will not be capable to form blends of some stability even if the specific weights of the constitutents of the system are identical. In the absence of mutual surface adhesion, or without an auxiliary phase, such a system can be said to be "immiscible" in the sense that any homogeneous distribution of the minor portion in a given space contaning the other portion will dehomogenize spontaneously, e.g. by the impact of gravity, so as to result in different space portions with undue high concentrations of the one or the other portion.

Conventional devices of the paddle mixer type are not capable of improving interdispersion of the constituents of such systems, neither by increasing the mixing intensity (e.g. increased rpm of a rotating mixing element) nor by increasing the mixing period. In practice, a somewhat uniform mutual distribution of the constituents can be achieved by distributing both components on a common carrier surface so that the constituent with the larger particle size is provided substantially in the form of a "two-dimensional" layer (average layer thickness = average particle diameter), e.g. by means of an endless conveyor belt, and subsequent discharge of the "surface-blend" into a processing apparatus. Screw mixers for continuous operation may also be used according to this surface-distribution mechanism. Application of this mechanism for practical mixing purposes is limited and prior art devices operating in this fashion are quite large, or require a complicated and costly structure.

A commercially important solids/solids distribution problem of the type mentioned above is continuous intermingling of a minor portion of an additive consisting of comparatively small particles, such as pigment powders or the like, in a granulate, e.g. a particulate thermoplastics. Bulk-dispersion of the additive in a thermoplastic material, e.g. pigment addition to a thermoplastics mass in connection with production and subsequent granulation of the mixture, is a conventional method of avoiding this problem but this method conflicts with the requirements of many processors for a reduced diversification of storage items, an economic operation and an easy change of compounding formulae.

Various processing devices for continuous operation and with the aim to solve the above problem are known and include a stationary mixing zone or mixing chamber that includes a rotary mixing element.

Swiss Pat. No. 554,229, for example, discloses metered addition of a finely divided pigment to a relatively coarse plastics granulate by means of a metering screw for pre-blending the pigment and the granulate and introducing the pre-blended material into a blending zone provided within a stream of the granulate for distribution therein by means of a post-blending element that rotates around a horizontal axis. The inlet for the granulate stream is provided above the rotary blending element. As a consequence, the blending zone is subject to the hydrostatic head or pressure of a column of superimposed granular solids. This is disadvantageous for operation as it limits the blending homogeneity that can be achieved with a given drive power, and because it requires a relatively costly apparatus.

A so-called automated coloring device for plastics processing is disclosed in "Kunststoffe-Plastics" (Carl Hanser Verlag, Munich), Volume 21 (1974), pages 29–31, and includes a blending chamber for lateral introduction of granulate as well as a rotary blending element that rotates around a vertical axis. While the disadvantages of hydrostatic pressure inpact upon the blending zone is avoided, the effect of the blending element varies throughout the cross-section of the processed stream.

SUMMARY OF THE INVENTION

Accordingly, it is a main object of this invention to provide for an improved apparatus for continuous distribution of an additive material in a stream of a particulate solids material.

Another main object is an improved method of distributing one or more additive materials in a stream of a particulate solids material.

A further object is an apparatus for the purposes mentioned above without the disadvantages of prior art devices and providing for an effective and homogeneous distribution of one or more additives in a stream of a solids material by means of a simple and compact apparatus for economic operation in connection with well known processing installations that are supplied with a stream of a particulate solids, e.g. plastics granulate, intermingled with a minor portion of conventional additives, such as pigments.

Yet another object of the invention is a device for distributing at least one additive in a stream of master or base material with a simple apparatus and a relatively minor operational effort even when the constituents of the system do not form a stable blend in the sense explained above.

Further objects will become apparent as the specification proceeds.

I have found that the above objects and further advantages can be achieved according to this invention if the area of continuously intermingling the additive or additives with a stream of a particulate master or base material is provided within a defined chamber space that is supplied with the particulate master and additive materials in a specific manner explained in more detail below, and which chamber includes a rotary distributor element effecting small radial mixing forces only and permitting a controlled and/or differentiated impact upon the components fed into the chamber.

Specifically, the distributor element is provided for rotation around a substantially horizontal axis in said chamber where the inlet for the stream of particulate solids that constitute the master or base material is located below the upper horizontal tangent line at the periphery of the circular path of the rotating distributor element while the inlet for the additive is located above the said upper horizontal tangent line.

BRIEF DESCRIPTION OF PREFERRED EMBODIMENTS

According to a first preferred embodiment, this invention provides an apparatus for continuous distribution of an additive material in a pourable particulate solids master or base material, said apparatus comprising a chamber having a chamber space including a distributor means for rotation around a substantially horizontal axis and defining a circular path in a substantially vertical plane, said path having a peripheral upper horizontal tangent line, a first inlet for feeding said master or base material into said chamber, at least one second inlet for feeding said additive material into said chamber, and an outlet for a stream of said master or base material with said additive material dispersed therein; said first inlet for said master or base material being disposed below said peripheral upper horizontal tangent line of said circular path while said second inlet for said additive material is disposed above said peripheral upper horizontal tangent line of said circular path.

The inventive apparatus provides for the use of a rotary distributor means in which the effective front faces, i.e. the surface portion of the distributor means that will collide with particles in the path of rotation when the distributor means is rotated, are structured for minimum turbulence of a stream of particles fed into and through the chamber while having a marked distribution effect upon the additive for reasons that will be explained below in more detail. In general, the inventive apparatus, when compared with prior art devices, provides an improved homogeneity of distribution of the additive in the master or base and/or a higher throughput with a given chamber volume that is small in relation to the volume of the stream and a given drive energy.

According to a second preferred embodiment, this invention provides a method of operating the apparatus according to said first embodiment for a continuous metered distribution of at least one controlled stream of an additive material selected from the group consisting of particulate solid and liquid additives in a controlled stream of a pourable particulate master or base material comprising the steps of introducing said additive and said master or base material at a feeding rate and discharging a stream of a blend of said additive material and said master or base material at a discharge rate, said total feeding rate and said discharge rate being controlled for maintaining a charging level of said chamber that does not substantially exceed the peripheral upper horizontal tangent line of the circular path of the rotating distributor means.

BRIEF DESCRIPTION OF THE DRAWINGS

The invention will now be explained by means of the drawings in which:

FIG. 1 is a semi-diagrammatic, partially broken away perspective view of a preferred embodiment of the inventive apparatus;

FIG. 2 is a horizontal cross-sectional view taken along the line 2—2 in FIG. 1;

FIG. 3 is a vertical cross-sectional view along the line 3—3 in FIG. 2;

DETAILED DESCRIPTION OF PREFERRED EMBODIMENTS

Figure 4:
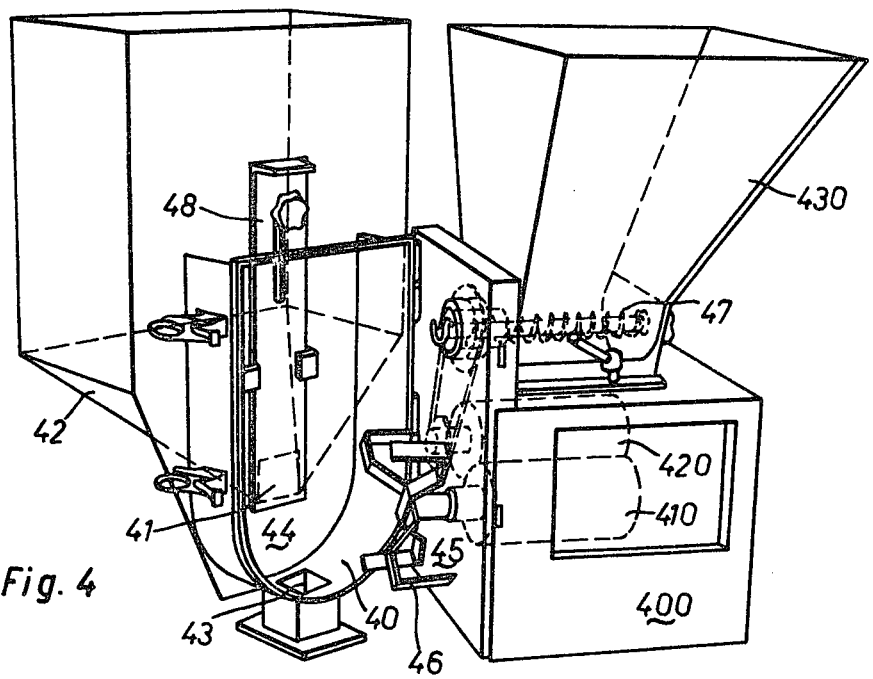
FIG. 4 is a semi-diagrammatic perspective view of another preferred embodiment of the inventive apparatus including, in addition to the chamber and the rotary distributor, reservoir containers, metering means and drive means.

Chamber 10 shown in FIG. 1 to 3 comprises a pair of longitudinal chamber walls 13, 15, a pair of side wall portions 17 interconnected by a bottom wall portion 171 and a top wall or lid 19. Wall 13 in FIG. 1 is broken away in part to better show details of the rotary distributor means 12. A substantially horizontal axis or drive shaft 14 is provided for rotation of distributor 12 composed, for example, of four arms 120, 121, 122 and 123. Drive shaft 14 is supported by a bearing (not shown) secured to chamber wall 13. Chamber walls 13, 15 are designated as "longitudinal" walls while wall portions 17 are designated as "side" walls. While a single inlet 11 for additive material is shown in FIGS. 1 and 3, it is understood that the inventive apparatus may include two, three or more such inlets, depending upon the number of additive materials or additive streams that are to be distributed in the base or master. In general, the additive inlet or inlets will be the discharge end of any type of prior art metering device of the volumetric or gravimetric type and may be provided on any of the longitudinal walls 13, 15, or any of the side wall portion 17, or on top wall 19. If desired for particular processing requirements, e.g. for additive liquids or pastes, a separate additive inlet may be provided below the horizontal upper tangent line 4 shown by a broken line on top of circular path 5. Furthermore, provision of a top chamber wall 19 is not believed to be critical as the chamber top may be left open, or be provided with a removable lid or similar cover. A portion of a reservoir or hopper 30 for the master is shown diagrammatically in FIGS. 2 and 3 but is not shown in FIG. 1.

Inlet 16 for a stream of a particulate master or base material is provided on wall 15 and is always situated below the upper horizontal tangent line 4 of circular path 5, i.e. the periphery of the rotational space defined by distributor 12 upon its rotation. Preferably, inlet 16 is situated substantially at the center of circular path 5, or somewhat below that center. Outlet 18 for the stream of particulate master material and additive dispersed therein is arranged at or near the lowest part of the connecting wall portion between side walls 17, i.e. at the lowest point or center of curved wall portion 171.

The number of arms of distributor 12 is not believed to be of critical importance. While four arms 120, 121, 122 and 123 are shown as constituents of the preferred distributor 12 in the drawings, only a single arm 120 might be sufficient for operation of the apparatus. For smoothness of operation, a balanced and generally symmetrical arrangement of two, three, four or more arms is preferred. For a particularly preferred embodiment of the inventive apparatus it is essential, on the other hand, that the space of rotation of the distributor and the shape of the chamber space are mutually conformed as will be discussed in more detail below. For that reason, arms of equal radial length are preferred.

The preferred general geometry of chamber 10 in relation to distributor 12 and space 20 defined by rotation of the distributor will be apparent from the preferred apparatus structure shown in FIGS. 1 to 3: The horizontal cross-section shown in FIG. 2 includes a hatched portion to indicate the cross-sectional area of space 20 having a symmetry of rotation defined by the configuration of the rotary distributor.

In accordance with the substantially rectangular cross-sectional shape of the chamber space defined by walls 13, 15 and 17, when viewed in a horizontal plane 2 through the center of rotation defined by axis or shaft 14, space 20 has a generally cylindrical outer configuration, but such cross-sectional shape of the chamber space might as well be square-shaped, trapezoidal, hexagonal or circular and rotation of such a shape will produce a correspondingly modified space configuration including tapered or conical as well as spherical shapes of the rotational space. Proper selection of a suitable cross-sectional chamber space configuration as well as selection of a suitable shape of the chamber bottom portion, when viewed in a vertical radial plane (i.e. a vertical plane normal to the axis of rotation of the distributor, e.g. the plane defined by line 3—3 in FIG. 2), will depend upon the configuration of axially symmetrical space 20. Preferably, the lower half of such space 20 is geometrically similar to the adjacent chamber portion and substantially fills that chamber space portion situated below the horizontal plane through line 2—2 of FIG. 3, i.e. the hatched area 31. If the cross-sectional area of the chamber space in the axial horizontal plane has an elongated rectangular shape as shown in FIGS. 1 and 2, distributor 12 will include at least one arm 120 having a total axial length substantially of the same size as half the length of the cross-sectional area of the chamber space in the axial horizontal plane and all arms will have a substantially equal radial length. The total axial length of distributor 12, on the other hand, will substantially approach the width of the chamber space, i.e. the distance between longitudinal walls 13 and 15. If arm 120 is provided, according to a preferred embodiment, with an axially extending end portion 120a cranked substantially parallel to the axis of rotation with all other arms having the same radial length and a similarly cranked end portion, the rotary distributor will encompass the above mentioned cylindrical space 20, the superficies of which correspond with circular path 5 shown in FIG. 3 and will be situated near wall portion 171 that has a half-cylindrical shape. The circular end faces of cylindrical space 20 are parallel and situated near walls 13 and 15.

Preferably, end portions 120a, 121a, 122a, 123a and the connecting portions 120, 121, 122 and 123 of the arms are shaped so as to cause a relatively small shearing force upon the processed material, e.g. by providing them with a band-shaped cross-section of the type shown in the drawings. The shape of the connecting arm portions, i.e. those connecting each end portion with shaft 14, can be modified as illustrated in FIGS. 1, 2 and 4 so as to provide for controlled holding or jamming of the particle stream that is admitted into the chamber via inlet 16. It is apparent that such holding effect can be varied for a given distributor structure by changing the rotation rate of the distributor.

Inlet 11 for additive 111 will be arranged generally above the upper horizontal tangent line 4 of circular path 5 and, in any case, above inlet 16 that connects chamber 10 with hopper or reservoir container 30 for the master. The size of inlet 16 and, accordingly, the cross-section of the stream of the particles 33 of master material supplied via container 30 can be varied by means of a slide plate or valve (not shown in FIGS. 1 to 3).

The reasons for the surprisingly high effect of such a structurally and operationally simple compact apparatus according to the invention with regard to homogeneity of a master/additive blend of the type of main interest here, even when operated with an extremely low drive power input requiring typically only a fraction, e.g. 20 %, of the drive power required for prior art pre-blending devices, are not fully understood but may be due to a novel blending mechanism that is substantially different from the blending mechanisms of prior art rotary pre-blenders for continuous operation. One explanation of the novel blending mechanism will be given with particular reference to FIG. 3: Upon rotation of the distributor or blending element in the direction of the curved arrow, an accumulation of material in the left half portion of the blending chamber, notably in the chamber space between lines 2—2 and 4—4 at the left side of a vertical connecting line between inlets 11 and 16, may result when input and output rates of the apparatus are in equilibrium. The master material particles 33 that enter into the chamber from container 30 via inlet 16 will be caused to move in a generally upward direction due to the movement of the distributor arms and rise to a maximum level substantially limited by line 4—4. Accordingly, the charging level of the chamber is highly in the chamber area where the distributor arms move in a generally upward direction, and is lower - e.g. down to line 2—2 or below - in the chamber area where the distributor arms move in a generally downward direction. As a consequence, a slope or inclined surface typically of the type indicated by an inclined dash-dot line in FIG. 3 is formed and the particles at the higher portion of the charge level will tend to roll down the sloped surface, mainly due to gravitational forces. The processed material constituted by the master particles 33 and metered additive indicated by fine particles or droplets 111 will be blended in a manner that is generally comparable to that of a barrel or mixer by mutual "over-rolling" of materials layers in virtual absence of hydrostatic pressure caused by overlying master particles. The effect of the inventive apparatus would thus be similar to a rotating barrel mixer with the advantages of continuous operation and a simpler and much more compact structure of the apparatus. Typically, the chamber space volume will amount to not more than about 3%, preferably not more than about 1%, of the bulk volume processed per hour.

Another and possibly complementary explanation of the improved operational results that can be achieved with the inventive apparatus is based upon the fact that the distributor shown in FIGS. 1 to 5 has a comparatively small frontal surface area in the direction of rotation if compared with prior art "paddle-type" blenders so that rotation can be achieved with a relatively small drive power. At the same time, the superficies of the cylindrical space defined by rotation of arm end portions 120a, 121a, 122a and 123a will produce a maximum effect in the areas where the streams of master particles and additive material intersect with the corresponding portion of the superficies of rotation space 20. This would imply a different effect upon the component material streams in the sense that the blending impact upon the additive streams is proportionally greater than the impact upon the stream of master particles.

The cross-sectional area of the space within the chamber as viewed in the horizontal axial plane is preferably of an elongated rectangular shape as illustrated in FIGS. 1 and 2, mainly because this provides for a most simple structre of both the stationary chamber and the rotary distributor. As noted above, however, such cross-sectional area may have a square, trapezoidal, polygonal or circular shape if the arms of the rotary distributor are shaped to form a geometrically similar cross-section of rotational space 20.

In general, the radially extending portions or arms of the rotary distributor are selected so as to effect relatively small radial forces upon the blended material and to provide for the rolling particle movement along a sloped surface of the charge, preferably by using relatively thin distributor arms or end portions so that the front area of the distributor in the direction of rotary movement provides for low shear forces as well as the desired particle over-rolling and deflection effects. Optimization of structural and operational parameters with regard to the particle size of the master or base material is well within the skill of the expert. For example, a metered additive stream consisting of gravity-fed particles or droplets 111 with typical particle sizes of below 500 micrometers can be distributed with excellent long-period and short-period uniformity in a stream of gravity-fed master particles 33 having typical particle sizes of above 1.5 mm by means of an inventive apparatus as disclosed above including a distributor 12 that has a radial arm length of from about 50 mm to about 250 mm at rotation rates within the range of from about 10 rpm to about 150 rpm.

It is generally preferred that the outlet 18 disposed at the lowest part of the bottom or wall portion 171 of chamber 10 be substantially covered by the superficies of the axially symmetric shape 20 that constitutes the circular path 5 so that the blend stream of master particles and additive is forced to substantially intersect with the said superficies.

Figure 5:
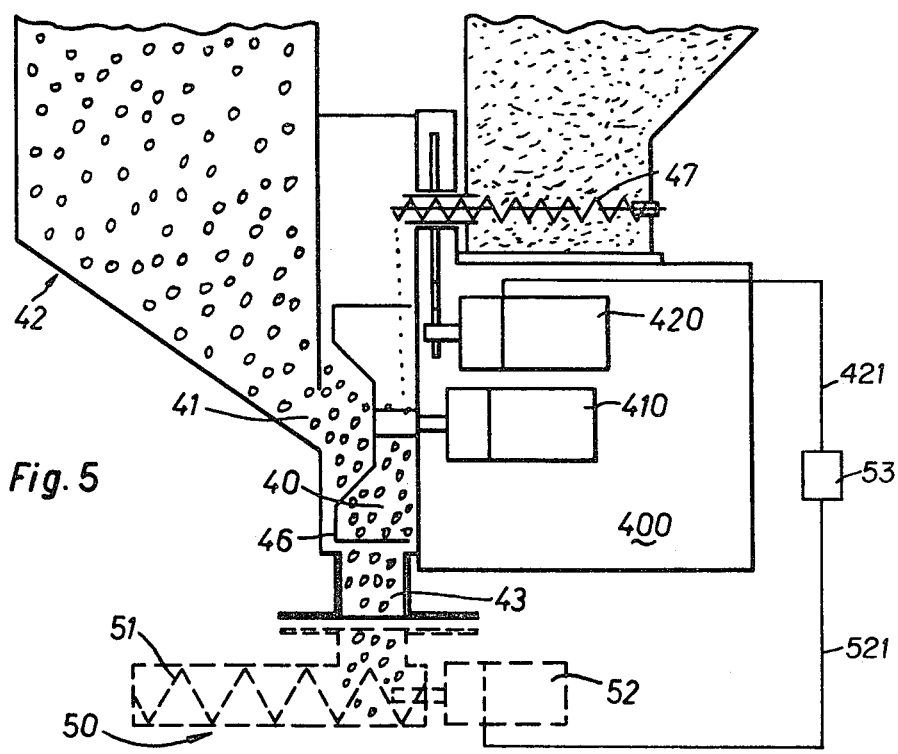
FIG. 5 is a vertical cross-sectional view of the apparatus of FIG. 4 mounted on a coordinated down-stream discharge device.

As shown in FIG. 4, chamber 40 will be supplied with a stream of master particles from hopper or reservoir 42 via inlet 41 provided with a slide valve 48. The rate of flow of such stream will, in general, be controlled by a discharge device 50 such as shown in FIG. 5 by means of broken lines at the lower or downstream end of outlet 43. While the discharge device 50 is shown to include a discharge screw 51 that may or may not be the screw of a conventional thermoplastics extruder arranged downstream of the inventive apparatus for continuous supply with a pre-blend of master and additive, other conventional conveyers or flow control means capable of maintaining a predetermined rate of discharge from the inventive apparatus may be used.

It is to be noted that a preferred use of the inventive apparatus is its combination with a prior art extruder employing at least one rotating screw for conveying and/or plastification of an extrudate. In such a combination, the inventive apparatus will replace the conventional hopper for supplying the extruder with any desired blend of master and additive materials prepared by continuous in situ blending. However, the inventive apparatus is suitable as well for discontinuous repeated discharge operation, preferably with concomitant adjustment of the additive stream, and can be used to replace the hopper of conventional injection molding devices with the advantage of in situ pre-blending as explained above.

In the apparatus of FIG. 4 longitudinal wall 44 of chamber 40 is formed by an outer wall of hopper 42 while opposite wall 45 of chamber 40 is part of an assembly 400 that can be removed, e.g. pivoted, from the chamber and includes drives 410, 420 for operation of rotary distributor 46 and a conventional additive metering device 47, respectively. As mentioned above, the inventive apparatus may be provided for blending of a particulate master or base material with more than one additive and a correspondingly increased number of additive reservoirs and metering devices will be required as the only essential modification.

FIG. 5 shows a semi-diagrammatic cross-sectional view of the apparatus of FIG. 4 mounted upstream on discharge device 50 that includes a screw 51 operated by drive 52. The stream of particulate master material, i.e. the throughput of particulate base material, will, in essence, be controlled by the conveying rate of the discharge device. Preferably, the discharge rate of metering device 47, or the metering devices, will be coupled with the discharge rate of device 50, e.g. by well known mechanical or electrical means. Such control means are schematically indicated in FIG. 5 as means 53. Also shown are leads 421 and 521 which connect means 53 with drives 420 and 52, respectively.

It is evident that the preferred apparatus structure shown in FIGS. 4 and 5 provides for easy accessibility of the chamber space and this is of considerable advantage not only for simplified maintenance, repair and cleaning, but for easy adaption to varying processing requirements, e.g. by exchanging the distributor as well.

The use of the inventive apparatus for continuously dispersing finely divided particulate or liquid additives, adjuvants and the like in a master or base material consisting of relatively coarse particles is preferred but non-limiting. In general, the only requirement with regard to the particulate master or base material is its pourability, i.e. its capacity to flow into and through the chamber space under the impact of gravitational forces.

The inventive apparatus can be used for continuous blending in such different fields as preparation, processing or compounding of plastics, cosmetics, foods and, generally, in process technology. For example, granulates or regenerates of thermoplastic polymers, copolymers or compositions including polypropylene, polyethylene, polystyrene, ABS-resins, polyamides, polyvinylchlorides, polyacrylonitrile, polycarbonates and the like can be blended continuously in the course of conventional processing methods, e.g. extrusion, injection and the like methods, with fillers, pigments, coloring or dyeing materials, dye solutions, stabilizers, plasticizers, etc. On the other hand, filler type materials can be processed as the base material in the inventive apparatus and blended therein with binders as additives; further, duroplastics precursors or prepolymers in the form of powders or granulates as the base material can be blended with catalysts, cocatalysts, dyes, pigments, blowing agents and the like additives. Cut fiber-glass can be processed advantageously as a base material in the apparatus for blending with suitable binders including thermoplastic and duroplastic materials, or for pre-blending with other filler type materials. In food processing (including foods for consumption by humans or animals), the inventive apparatus is suitable for blending cereals or other forms of carbohydrates, proteins and the like as the base material with specific nutrient additives, vitamines, flavors and the like, preferably in the course of conventional processing methods, e.g. extruding and subsequent pelletizing. In the cosmetics field, the inventive apparatus may be used, for example, to blend talcum, rice starch and the like base materials with additives such as boric acid, bactericides, perfumes, etc.

In the following specific examples of the operation and effectiveness of an inventive apparatus, percentages are by weight.

EXAMPLE I

The apparatus of FIGS. 4 and 5 with a chamber space volume of about 1700 cm$^3$ was operated at a rate of rotation of about 60 rpm to continuously disperse a pigment powder having an average particle size of about 500 micrometers in a pourable (i.e. free-flowing) granulate having an average particle size of about 1.5 mm at a discharge rate of about 300 kg per hour. An excellent homogeneity of distribution (interdispersion at the outlet cross-section) of the pigment in the particulate master or base material was obtained.

When processing the same components in a prior art pre-blender of comparable size and conditions of operation, a maximum discharge rate of the pre-blended material of only about 20% was achieved.

When varying the rate of rotation of the inventive apparatus of FIGS. 4 and 5, it was observed that good results were achieved when operating the distributor 46 at rates of rotation in the range of from about 20 to about 100 rpm, and that higher rotation rates within this range were of advantage when processing master or base materials with a relatively smaller particle size (500 to 1500 micrometers). Best results were obtained when the maximum charging level of the constituents in chamber 40 was kept substantially at or below the upper horizontal tangent line of the circular path or periphery of the rotating distributor, i.e. in the virtual absence of hydrostatic pressure exerted by the particulate material.

EXAMPLE II

Example I was repeated with the inventive apparatus mounted upstream on an injection moulding machine with a per shot capacity (weight of injected material per shot) of about 60 g. The injection moulding machine was of a conventional structure and the inventive apparatus was used instead of the hopper of such a structure.

When operating under the conditions of Example I, the chamber of the inventive apparatus held about 1200 g of the thermoplastics granulate. When discharging a portion of 60 g including 1% of pigment additive distributed therein through outlet 43, a theoretical input or feed rate of 59.4 g of granulate from hopper 42 through inlet 41 and of 0.6 g of pigment from reservoir 430 should be fed into chamber 44.

Assuming an extremely high short period discontinuity in the input rate of the additive as could be caused by pigment aggregation and formation of pigment lumps at the discharge end of metering screw 47, discharge of a short portion of 60 g through chamber outlet 43 yields the following balance:

| | |
|---|---|
| Amount of material in chamber 40: | 1140 g of blend containing 1 % pigment (1128.6 g of granulate and 11.4 g of additive) |
| Supply to chamber 40: | 59.7 g of granulate and 0.3 g of additive |

Thus, the composition of the charge in chamber 40 immediately after the shot is as follows:

Thermoplastics (granulate): 1128.6 g + 59.7 g = 1188.3 g

Pigment (additive): 11.4 g + 0.3 g = 11.7 g

Total blend: 1200 g including 0.975% of pigment.

Accordingly, a short term metering discontinuity as large as 50% will be reduced by the inventive apparatus to only 2.5%. With a direct-pigmenting apparatus according to prior art, any discontinuity of the additive supply would appear substantially unchanged at the entry to the feeding screw of the injection molding apparatus.

As will be apparent from the above, the invention provides substantial advantage in the operation of any conventional equipment for the production of compositions streams (that may be shaped as by molding, extrusion or injection) that consist of a master or base material and of one or more additives if the inventive apparatus is used at the input or upstream end of such conventional equipment.

For improved distribution of the additive or additives in the composition stream typical chamber volumes of the inventive apparatus in the range of from about 0.5 liters to about 20 liters will be sufficient in many instances for blend-production rates of some hundred to several thousand kilograms per hour at very low costs for the blending apparatus and its operation.

Various modifications of the inventive apparatus as well as of its operation within the ambit of the disclosure will be apparent to the expert in the process technology art.

Accordingly, what I claim is:

1. An apparatus for continuous distribution of an additive material in a particulate solids master or base material, said apparatus comprising a chamber having arranged therein distributor means for rotation around a substantially horizontal axis and defining a circular path in a substantially vertical plane, said path having a peripheral upper horizontal tangent line substantially defining the maximum charge level of said chamber, a first inlet for feeding said master or base material into said chamber, at least one second inlet for feeding said additive material into said chamber, and an outlet for a stream of said master or base material with said additive material dispersed therein, said outlet being located in the bottom part of said chamber, said first inlet for said master or base material being disposed below said peripheral upper horizontal tangent line of said circular path and said second inlet for said additive material being disposed at a distance above said maximum charge level defined by said peripheral upper horizontal tangent line of said circular path.

2. The apparatus of claim 1 comprising a discharge means arranged downstream from said outlet for controlling said stream of said base or master material with said additive material dispersed therein.

3. The apparatus of claim 2 comprising a metering means disposed upstream from said second inlet for said additive material.

4. The apparatus of claim 3 comprising means for controlling said metering means in a functional dependence on said discharge means.

5. The apparatus of claim 1, wherein said distributor means comprises at least one arm having a cranked end portion and wherein said chamber space includes a chamber space portion below a horizontal plane through said horizontal axis of said rotation shaped in substantial conformity with a lower half portion of the space defined by said rotation of said distributor means.

6. The apparatus of claim 5, wherein said chamber space has a substantially rectangular cross-sectional shape defined by a pair of longitudinal chamber walls and a chamber side wall when viewed in a horizontal plane through said axis, and a substantially U-shaped cross-section when viewed in a vertical radial plane, and wherein said space encompassed by said rotation of said distributor means has a substantially cylindrical shape having a radial diameter approaching the length of said longitudinal chamber walls when viewed in said horizontal plane, and an axial dimension for extending over said outlet arranged in a bottom portion of said chamber.

7. The apparatus of claim 6, wherein said first inlet for feeding said master or base material into said chamber is disposed in one of said longitudinal chamber walls while the other of said longitudinal chamber walls has an opening for receiving said horizontal axis.

8. The apparatus of claim 7, wherein said first inlet for said master or base material is arranged substantially at the axial center of said cylindrical space of said rotation of said distributor means.

9. The apparatus of claim 1, wherein said distributor means comprises at least two arms each of which extends in a radial and in an axial dimension, both of said arms being substantially isomorphous.

10. The apparatus of claim 9, wherein said distributor means is shaped to avoid turbulence in said master or base material.

11. The apparatus of claim 7, wherein at least one of said pair of longitudinal chamber walls is removably attached to said apparatus.

12. The apparatus of claim 11, wherein said at least one of said pair of longitudinal chamber walls is pivotably attached to said apparatus.

13. The apparatus of claim 7 comprising at least one reservoir container for receiving said master or base material and for feeding same into said chamber through said first inlet, said reservoir container portion being secured to said one of said longitudinal chamber walls in which said first inlet is provided.

14. The apparatus of claim 4 comprising at least one reservoir container for said additive material attached to a pivotable housing portion that includes a drive for said distributor means and a drive for said metering means.

* * * * *